United States Patent [19]

Redpath et al.

[11] Patent Number: 5,430,105

[45] Date of Patent: Jul. 4, 1995

[54] LOW SEDIMENT PROCESS FOR FORMING BORATED DISPERSANT

[75] Inventors: John V. Redpath, North Brunswick, N.J.; Ronald P. Wangner, Garden City, N.Y.; Steven P. Winston, Yorba Linda, Calif.

[73] Assignee: Exxon Chemical Patents Inc., Linden, N.J.

[21] Appl. No.: 156,342

[22] Filed: Nov. 22, 1993

Related U.S. Application Data

[63] Continuation-in-part of Ser. No. 992,413, Dec. 17, 1992, abandoned.

[51] Int. Cl.$^6$ .................... C08F 255/10; C08F 8/32
[52] U.S. Cl. ................................. 525/285; 525/337
[58] Field of Search ........................... 525/285, 337

[56] References Cited

U.S. PATENT DOCUMENTS

| | | | |
|---|---|---|---|
| 3,087,436 | 12/1960 | Dettlof et al. | 103/130 |
| 3,087,936 | 4/1963 | Le Suer | 564/8 |
| 3,172,892 | 3/1965 | LeSuer et al. | 260/326.5 |
| 3,215,707 | 11/1965 | Rense | 260/326.3 |
| 3,231,587 | 1/1966 | Rense | 260/346.8 |
| 3,272,746 | 9/1966 | LeSuer et al. | 252/47.5 |
| 3,275,554 | 9/1966 | Wagenaar | 252/50 |
| 3,313,727 | 4/1967 | Peeler | 252/18 |
| 3,361,673 | 1/1968 | Stuart et al. | 252/51.5 |
| 3,381,022 | 4/1968 | LeSuer | 260/404.8 |
| 3,401,118 | 9/1968 | Benoit | 252/51.5 |
| 3,438,757 | 4/1969 | Honnen et al. | 44/58 |
| 3,442,808 | 5/1969 | Traise et al. | 252/49.6 |
| 3,445,441 | 5/1969 | Rushton | 260/89.5 |
| 3,565,804 | 2/1971 | Honnen et al. | 252/50 |
| 3,649,229 | 3/1972 | Otto | 44/73 |
| 3,671,478 | 6/1972 | Dyle et al. | 525/337 |
| 3,798,165 | 3/1974 | Plasek et al. | 252/51.5 |
| 3,865,763 | 2/1975 | Feniak | 525/337 |
| 3,912,764 | 10/1975 | Palmer | 260/346.8 |
| 3,976,624 | 8/1976 | Inouge et al. | 525/337 |
| 4,000,353 | 12/1976 | Gardiner | 526/20 |
| 4,025,445 | 5/1977 | Hellmuth et al. | 252/49.6 |
| 4,110,349 | 8/1978 | Cohen | 260/346.74 |
| 4,234,435 | 11/1980 | Meinhardt et al. | 252/51.5 |
| 4,419,387 | 12/1983 | Campbell et al. | 427/215 |
| 4,578,086 | 3/1986 | Puri et al. | 23/300 |
| 4,801,404 | 1/1989 | Dietrich et al. | 252/607 |
| 4,820,432 | 4/1989 | Lundberg et al. | 252/51.5 |
| 4,828,742 | 5/1989 | Lundberg et al. | 252/51.5 |
| 4,834,913 | 5/1989 | Aseltine et al. | 252/601 |
| 4,857,217 | 8/1989 | Gutierrez et al. | 252/47 |
| 5,102,566 | 4/1992 | Fetterman et al. | 252/32.7 |

FOREIGN PATENT DOCUMENTS

| | | |
|---|---|---|
| 0132383 | 1/1985 | European Pat. Off. . |
| 2168925 | 9/1973 | France . |
| 1440219 | 6/1976 | United Kingdom . |

OTHER PUBLICATIONS

Brinkmann Particle Size Analyzer "A Visible Difference in Size and Shape Analysis" Brinkmann Instruments, Inc., 1988.

PSA 2010 Particle Size Analyzer, Operation Manual, Version 4.2 (Jul. 1989).

W. W. Yau, J. J. Kirkland and D. D. Bly (Book not provided, will provide a copy upon request) "Modern Size Exclusion Liquid Chromatography" John Wiley & Sons, New York (1979).

*Primary Examiner*—Vasu S. Jagannathan
*Attorney, Agent, or Firm*—K. R. Walton

[57] ABSTRACT

A low sediment process for forming a borated, oil soluble, polymer-substituted, nitrogen- or ester-containing lubricating oil additive. A polymer-substituted, nitrogen- or ester-containing additive in the presence of a solvent therefor, is contacted under boronating reaction conditions in a reaction zone with particulate boric acid. The boric acid has a particle size distribution in lubricating oil characterized by a $\phi$ value of not greater than about 450. The $\phi$ value is the ratio of said particles' total spherical volume divided by said particles' total spherical external surface area; i.e., $$\phi = \frac{\text{total spherical volume}}{\text{total spherical surface area}} = \frac{\Sigma_i (4/3) N_i \pi d_i^3}{\Sigma_i N_i \pi d_i^2}$$

wherein, for each of a plurality of distribution segments defining a particle size range; $d_i$ is the average particle diameter for the ith distribution segment; $N_i$ is the particle volume percent of the ith distribution segment; and the sum is taken over all the distribution segments.

10 Claims, No Drawings

LOW SEDIMENT PROCESS FOR FORMING BORATED DISPERSANT

This is a continuation-in-part of application Ser. No. 992,413. filed Dec. 17, 1992, now abandoned.

FIELD OF THE INVENTION

This invention relates to the preparation of borated lubricating oil additives, and more specifically to the preparation of borated nitrogen-containing polymeric lubricating oil additives.

BACKGROUND OF THE INVENTION

Borated lubricating oil additives of many types have been proposed for use in lubricating oils. Principal among these are borated nitrogen-containing polymer lubricating oil additives such as dispersants, which are typically prepared by reacting a polymeric nitrogen-containing dispersant with a boronating agent, such as boric acid. Conventional borated dispersants include borated polyisobutenyl succinimides and borated Mannich base dispersants which are themselves prepared by borating a Mannich base reaction product derived from polyalkyl-substituted phenols, aldehyde and polyamine.

For example, when the nitrogen-containing dispersant comprises polyisobutenyl succinimide, it can be reacted with boric acid; water is evolved and the resulting salt product is the borated polyalkene succinimide. However, the above reactions also yield undesirable by-products, which are oil insoluble species which are generally required to be removed from the borated lubricating oil additive before it is either sold or incorporated into either fully formulated lubricating oils or into concentrates (so-called "adpacks" which are concentrates containing a variety of selected components). These oil insoluble species are detectable by adding solvent (normally at a 50 volume % level) to the product and spinning the dilute product in a centrifuge tube. These insoluble species are generally measured as a volume percent of the total graduated centrifuge tube.

U.S. Pat. No. 3,087,936 is directed to the preparation of a reaction product of an aliphatic olefin polymer succinic acid or anhydride with an amine, followed by reacting the resulting product with a boron compound, such as boric acid.

U.S. Pat. No. 3,313,727 is directed to the preparation of stable dispersions of alkali metal borates in lubricating oil wherein a hydrated alkali metal borate is admixed with an emulsifying agent in an amount sufficient to maintain the borate particles as stable dispersion. The particles are said to be almost entirely less than 1 micron in size and, for the most part, less than 0.5 microns. Suitable alkali metal borates are metaborates and tetraborates of sodium and potassium having from 1 to 4 waters of hydration. Neutral dispersants such as alkenyl succinimides of alkaline amines can also be present in these compositions.

U.S. Pat. No. 4,025,445 relates to boron amide lubricating oil additives which are obtained by mixing a chlorinated hydrocarbon with an alkylene polyamine to form a nitrogen-containing reaction product which is then combined with a boron compound for reaction of the boron compound with the nitrogen-containing reaction product. The additive thus formed is disclosed to be effective as an antirust crankcase lubricating oil additive. The boron compounds which were said to be useful include boron oxide, boron trifluoride, boron tribromide, boron trichloride and boric acid. Examples in this patent illustrate the use of an unspecified powdered anhydric boric acid, and filtering of the resulting boric reaction product.

U.S. Pat. No. 4,419,387 is directed to preparation of a boric acid having improved handling properties. The patentee discloses that in the manufacture of boric acid, crystals of fine particle size (less than about 75 microns in size) are generally separated from the product, since these fines are unsuitable for most customers due to their dustiness and difficult handling properties. The patentee contacts boric acid particles with gaseous ammonia to reduce the lubricity of the boric acid crystals. Use of such reduced lubricity boric acid crystals in glass manufacture is disclosed. U.S. Pat. No. 4,487,803 contains a similar disclosure.

U.S. Pat. No. 4,578,086 is directed to a method for controlling boric acid particle size distributions for boric acid crystallized from saturated aqueous feed solutions thereof. It is disclosed that crystals in boric acid prepared from prior art processes generally are of a mean particle size of about 190 to about 195 microns or less, and that this mole size causes problems with subsequent purification, handling and storage. The patentee employs a water soluble acrylamide homopolymer or copolymer in the aqueous solution from which the boric acid is crystallized in order to increase the mean particle size of the crystal and boric acid.

U.S. Pat. No. 4,801,404 is related to boric acid suspensions useful for biocide components and wood preservatives and as fire retardant components for wood treatments, which comprise concentrated, finely dispersed suspensions of boric acid and a small amount of soluble borate salt in an aqueous medium. The patentee contrasts the patent's suspension with prior art highly concentrated to solutions of boric acid and water soluble amines or polyamines, and points out that the amine components interfere in many uses in that this component is additionally introduced into the resulting mixtures to which the concentrated boric acid solution is applied.

U.S. Pat. No. 4,834,913 relates to an apparatus and method for forming finely divided dry boric acid.

SUMMARY OF THE INVENTION

The process of the present invention provides an improved low sediment borated lubricating oil product useful in lubricating oil concentrates and fully formulated lubricating oils. The improved low sediment process for forming a borated, oil soluble, polymer-substituted, nitrogen- or ester-containing lubricating oil additive comprises:

(a) contacting a polymer-substituted, nitrogen- or ester-containing additive in the presence of a solvent therefor, under boronating reaction conditions in a reaction zone with particulate boric acid having a particle size distribution in lubricating oil characterized by a $\phi$ value (hereinafter defined) of not greater than about 450, and preferably less than 430 microns, wherein said $\phi$ value is the ratio of said particles' total spherical volume divided by said particles' total spherical external surface area; wherein the total spherical volume is the sum of all sphere volumes of formula $(4/3)N\pi d^3$ of each of a plurality of distribution segments and the total spherical external surface is the sum of all sphere surface areas of formula $N\pi d^2$ of each said distribution segment; wherein for each said segment, N is the particle volume percent of the segment and d is the average particle diameter; and (b) recovering said borated additive.

In accordance with a preferred embodiment, a polyalkenyl-substituted succinimide dispersant additive is contacted in lubricating oil with boric acid having the above recited average particle size characteristics. A particularly preferred product in accordance with the process of this invention is a borated oil soluble polyisobutylene-substituted nitrogen- or ester-containing lubricating oil dispersant additive.

It has been found that borated lubricating oil additives can be formed with such improved low sediment employing characteristics by the process of the present invention, in contrast to the high sediment levels which result from the use of boric acid particles having a $\phi$ value of greater than about 450. A useful determination of volume corrected average particle diameter is referred to in a brochure, *Brinkmann Particle Size Analyzer, A Visible Difference in Size and Shape Analysis*, Brinkmann Instruments, Inc., 1988; and a useful apparatus and method for such determination is presented in Brinkmann, *PSA 2010 Particle Size Analyzer*, Operation Manual, Version 4.2 (July 1989) published by Brinkmann Instruments, Inc. and/or Galai Production, Ltd.

DETAILED DESCRIPTION OF THE INVENTION

The polymer-substituted additive which can be employed in the present invention can contain nitrogen, a carboxylic ester, a carboxylic thiol ester, a metal salt or a metal complex. The additive can comprise at least one dispersant adduct formed by reacting a reactive amine compound or a hydroxy-containing organic compound with a long chain hydrocarbon-substituted reactant comprising at least one member selected from the group consisting of:

(A) long chain hydrocarbons substituted with mono- or dicarboxylic acid, anhydride or ester groups, or thiol ester;

(B) halogenated long chain hydrocarbons;

(C) mixtures of formaldehyde and a long chain hydrocarbyl-substituted phenol; and (D) mixtures of formaldehyde and a reaction product formed by reaction of long chain hydrocarbons substituted with mono- or dicarboxylic acid, anhydride or ester groups and an amino-substituted, optionally hydrocarbyl-substituted phenol.

Useful and preferred polymer dispersants are the ashless, nitrogen or ester containing dispersants disclosed in U.S. Pat. No. 5,102,566 and the dispersants resulting from the reaction of Koch functionalized polymers and derivatizing compounds (e.g., amines and alcohols) as disclosed in commonly assigned U.S. Ser. No. 992,403, filed Dec. 17, 1992 (Docket No. PT-941) entitled "Functionalization of Polymers Based on Koch Chemistry and Derivatives Thereof."

The homopolymers and copolymers useful in the present invention can be conveniently characterized based on molecular weight range. Polymers and copolymers of low, intermediate and high molecular weights can be prepared.

Low molecular weight polymers are considered to be polymers having a number average molecular weight of less than 20,000, preferably from 500 to 5,000, more preferably from 1,000 to 5,000 and most preferably from 1,500 to 5,000. The low molecular weights are number average molecular weights measured by vapor phase osmometry. Low molecular weight polymers are useful in forming dispersants for lubricant additives.

Medium molecular weight materials having a number average molecular weight range of from 5,000 to 200,000, preferably 10,000 to 50,000; and more preferably, from 20,000 to 100,000 and most preferably from 25,000 to 80,000 are useful for viscosity index improvers for lubricating oil compositions. The medium number average molecular weights can be determined by membrane osmometry.

AMINE COMPOUND

The polymer-substituted nitrogen-containing additive employed in the present invention is prepared by contacting a long chain hydrocarbon substituted reactant with an amine compound containing at least two (e.g., from 2 to 20), preferably at least 3 (e.g., from 3 to 15), and most preferably from 3 to 8, reactive nitrogen moieties (that is, the total of the nitrogen-bonded H atoms) per molecule of the amine compound. The amine compound will generally comprise at least one member selected from the group consisting of ammonia, organic primary monoamines and organic polyamines containing at least one primary amine group or at least two secondary amine groups per molecule. Generally, the organic amines will contain from about 2 to 60, preferably 2 to 40 (e.g., 3 to 20), total carbon atoms and about 2 to 12, preferably 3 to 12, and most preferably from 3 to 8 (e.g., 5 to 9) total nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines.

Non-limiting examples of suitable organic amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2propylene)triamine; di-(1,3-propylene)triamine; N,N-dimethyl- 1,3-diaminopropane; N,N-di-(2-aminoethyl)ethylene diamine; N,N-di(2-hydroxyethyl)-1,3-propylene diamine; 3-dodecyloxypropylamine; N-dodecyl- 1,3-propane diamine; tris hydroxymethylaminomethane (THAM); diisopropanol amine; diethanol amine; triethanol amine; mono-, di-, and tri-tallow amines; amino morpholines such as N-(3aminopropyl)morpholine; and mixtures thereof.

Useful amines also include polyoxyalkylene polyamines. The polyoxyalkylene polyamines are preferably polyoxyalkylene diamines and polyoxyalkylene triamines, and may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403", etc.

The amine compound can comprise an amido-amine as described in U.S. Pat. No. 4,857,217. Such amido-amines can be formed by reacting a polyamine with an alpha, beta-ethylenically unsaturated compound, e.g., by reacting polyethylene amines (e.g., tetraethylene pentamine, pentaethylene hexamine, and the like), polyoxyethylene and polyoxypropylene amines, e.g., polyoxypropylene diamine, trismethylolaminomethane and pentaerythritol, and combinations thereof, with an acrylate-type compound. Most preferably the acrylate-type reactant is selected from the group consisting of lower alkyl alkyl-acrylates (e.g., methyl, ethyl, isopropyl, propyl, isobutyl, n-butyl, tert-butyl, etc., esters of methacrylic acid, acrylic acid, and the like).

Exemplary of such amido-amines are compounds of the formula:

$$NH_2[(CH_2)_vNH]_uC(O)C_2H_4[NH)CH_2)_v]_uNH_2$$

wherein u is an integer of from 1 to 10, and v is an integer of from 2 to 6.

Most preferred as the amine compound are members selected from the group consisting of ammonia and organic diprimary amines having from 2 to 12 carbon atoms and from 2 to 8 nitrogen atoms per molecule. Examples of such preferred organic diprimary amines are ethylene diamine, propylene diamine, diethylene triamine, dipropylene triamine, triethylene tetramine, tripropylene tetramine, tetraethylene pentamine, tetrapropylene pentamine, polyhexamethylene diamine, phenyl diamine.

Additional amines useful in the present invention are the amino-amido polymers described in U.S. Pat. No. 3,445,441.

Also useful are amine compounds referred to in commonly assigned U.S. Ser. No. 992,871, filed Dec. 17, 1992 (PT-915), "Amorphous Olefin Polymers, Copolymers, Methods of Preparation and Derivatives Thereof"

(A) Acid/ester Substituted Long Chain Hydrocarbons

The long chain hydrocarbyl polymer-substituted mono- or dicarboxylic acid reactants, i.e., acid, anhydride or acid ester used in this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxy group, i.e., of the structure

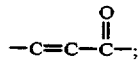

$$-C=C-\overset{O}{\overset{\|}{C}}-;$$

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid. Also useful are the derivatives of the above acids with thiol-containing compounds which can be analogs of the alcohols with S substituted for O. Preferred thiols include alkyl thiols including $C_1$ to $C_5$ and preferably $C_2$ to $C_5$ alkyl thiols.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain non-acid substituted polymer. The polymer-substituted mono- or dicarboxylic acid material (also referred to herein as "functionalized" polymer or polyolefin), non-acid substituted polyolefin, and any other polymeric by-products, e.g. chlorinated polyolefin, (also referred to herein as "unfunctionalized" polymer) are collectively referred to herein as "product residue" or "product mixture". The non-acid substituted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e., increased or decreased by techniques known in the art, such modifications do not alter functionality as defined above. The terms "polymer-substituted monocarboxylic acid material" and "polymer-substituted dicarboxylic acid material" as used herein are intended to refer to the product mixture whether it has undergone such modification or not.

Accordingly, the functionality of the polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the formation of dispersant additives will have number average molecular weights within the range of about 300 to 10,000, generally from about 700 and about 5,000, preferably from about 1,000 to 4,000, more preferably between about 1,300 and about 3,000. Particularly useful olefin polymers have number average molecular weights within the range of about 1,500 and about 3,000 with approximately one terminal double bond per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modem Size Exclusion Liquid Chromatography", John Wiley and Sons, New York, 1979.

The olefin polymers will generally have a molecular weight distribution (the ratio of the weight average molecular weight to number average molecular weight, i.e. $M_w/M_n$) of from about 1.0 to 4.5, and more typically from about 1.5 to 3.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g., 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g., 3 to 8 hours, so the product obtained will contain the desired number of moles of the monounsaturated carboxylic reactant per mole of the halogenated polymer. Processes of this general type are taught in U.S. Pat. No. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. No. 3,215,707; 3,231,587; 3,912,764; 4,110,349; 4,234,435; and in UK 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. No. 3,361,673 and 3,401,118.

Preferably, the polymers used in this invention contain less than 5 wt. %, more preferably less than 2 wt. %, and most preferably less than 1 wt. % of a polymer fraction comprising polymer molecules having a molecular weight of less than about 300, as determined by high temperature gel permeation chromatography employing the corresponding polymer calibration curve. Such preferred polymers have been found to permit the preparation of reaction products, particularly when employing maleic anhydride as the unsaturated acid reactant, with decreased sediment. In the event the polymer produced as described above contains greater than about 5 wt. % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel.

Other polymers which are useful in the present invention are the Koch functionalized polymers disclosed in commonly assigned U.S. Ser. No. 992,403, referred to earlier. The Koch functionalized polymers are formed by contacting a polymer composition comprising at least one polymer having at least one carboncarbon double bond (e.g., polyalkenes, ethylene-alpha-olefin copolymers, and the like) with carbon monoxide or a suitable carbon monoxide source such as formic acid, in the presence of an acidic catalyst. The catalyst has a Hammett Scale Value acidity (Ho) of less than −7 in order to be sufficiently active, particularly to form neo structures. Preferably the Hammett acidity of the catalyst is in the range of from −8 to −11.5. Useful catalysts include $H_2SO_4$, $BF_3$, and HF. The catalyst causes a carbenium ion to form at the point of unsaturation. The carbon monoxide reacts with the carbenium ion forming an acylium ion. Water or a hydroxy-containing compound or a thiol containing compound can be added to react with the acylium cation to form a carboxylic acid or a carboxylic ester/or a thiol ester. Preferably, the hydroxy-containing compound or water is added in combination with the catalyst as a catalyst complex. Preferred catalyst complexes include $(BF_3H_2O)$ and ($BF_3$. substituted phenols) with a most preferred catalyst complex being $BF_3$.2,4-dichlorophenol.

Using the Koch process, carboxyl groups, including carboxylic acid or carboxylic esters, can be formed at moderate temperatures and pressures at the point of unsaturation of the polymer of the present invention. The polymer is heated to a desired temperature range which is typically between −20° C. to 200° C. and preferably from 0° C. to 80° C. The pressure in the reactor can be maintained based on the carbon monoxide source, with pressures ranging up to 5,000 psig with a preferred range of from 500 to 3,000 psig.

(B) Halogenated Lone: Chain Hydrocarbons

Also useful as long chain hydrocarbyl reactants to form the improved dispersants of this invention are halogenated long chain aliphatic hydrocarbons (such as shown in U.S. Pat. Nos. 3,275,554, 3,438,757, 3,565,804 and 4,000,353) where the halogen group on the halogenated hydrocarbon is displaced with the reactive amine compound in the subsequent reaction therewith. For example, a polymer of a $C_2$ to $C_5$ monoolefin, e.g., polyethylene, polypropylene or polyisobutylene, wherein the polymer has an average molecular weight within the range of from 600 to about 3,000, preferably from about 800 to about 2,500, is halogenated with either bromine or chlorine; preferably the latter. The halogen may be conveniently added as gaseous chloride, liquid bromine, or a hydrohalogen, e.g., HCl or HBr gas.

The amount of halogen introduced will depend on the particular hydrocarbon used, the desired amount of amine to be introduced into the molecule, the particular alkylene amine used, and the halogen used. The amount of halogen introduced will generally be in the range of from about 1 to 5 halogen atoms per molecule, depending on the reactivity of the resulting halide. On a weight percent basis, the amount of halide will generally range from about 1 to 25, more usually from about 1 to 10.

The halogenation step may be conducted in the temperature range of from about ordinary ambient temperatures to about 120° C. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 120° C.

The halohydrocarbon and amine compound (e.g., alkylene polyamine or polyalkylene polyamine) may be brought together neat or in the presence of an inert solvent, particularly a hydrocarbon solvent. The inert hydrocarbon solvent may be aliphatic or aromatic. Also, aliphatic alcohols may be used by themselves or in combination with another solvent, when capable of dissolving the reactants.

The reaction may be carried out at room temperature (20° C.), but elevated temperatures are preferred. Usually, the temperature will be in the range of from about 100° to 225° C. For minimum sediment formation a preferred amination temperature range is from 115° to 135° C. Depending on the temperature of the reaction, the particular halogen used, the mole ratios and the particular amine, as well as the reactant concentrations, the time may vary from 1 to 24 hours, more usually from about 3 to 20 hours.

The mole ratio of halohydrocarbon to amine compound will generally be in the range from about 0.2 to 10 moles of amine compound per mole of halohydrocarbon, more usually 0.5 to 5 moles of amine compound per mole of halohydrocarbon. The mole ratio will depend upon the amount of halogen present in the halohydrocarbon, the particular halogen and the desired ratio of hydrocarbon to amine compound.

Small amounts of residual halogen in the final composition are not deleterious. Generally, the residual halogen, as bound halogen, will be in the range of 0 to 10 wt. of the composition. Small amounts of halogen may be present as the hydrohalide salt of the hydrocarbon substituted alkylene polyamines.

Generally, the hydrocarbons used will have aliphatic unsaturation. In particular instances, the amines may react in a way resulting in the elimination of hydrogen halide, introducing further aliphatic unsaturation into the hydrocarbon radical. However, the olefinic unsaturation does not significantly affect the utility of the product, and when available, saturated aliphatic halide may be used.

(C) Mixtures of Formaldehyde and Long Chain Hydrocarbon Substituted Phenol

Another class of long chain hydrocarbyl reactants to form the improved dispersants of this invention are any of the long chain hydrocarbyl-substituted hydroxy aromatic compounds which are known in the art as useful for forming Mannich condensation products. Such Mannich condensation products generally are prepared by condensing about 1 mole of a high molecular weight hydrocarbyl substituted hydroxy aromatic compound (e.g., having a number average molecular weight of 700 or greater) with about 1 to 2.5 moles of an aldehyde such as formaldehyde or paraformaldehyde and about 0.5 to 2 moles of the reactive amine compound, using the condensation conditions as disclosed, e.g., in U.S. Pat. Nos. 3,442,808; 3,649,229; and 3,798,165. Such Mannich condensation products may include a long chain, high molecular weight hydrocarbon on the phenol group or may be reacted with a compound containing such a hydrocarbon, e.g., polyalkenyl succinic anhydride as shown in said aforementioned U.S. Pat. No. 3,442,808.

Representative hydrocarbyl substituted hydroxy aromatic compounds contemplated for use in the present invention include, but are not limited to, 2-polypropylene phenol, 3-polypropylene phenol, 4-polypropylene phenol, 2-polybutylene phenol, 3-polyisobutylene phenol, 4-polyisobutylene phenol, 4-polyisobutylene-2-chlorophenol, 4-polyisobutylene-2-methylphenol, and the like.

(D) Mannich Base Condensation Products

Still another class of long chain hydrocarbyl reactants form the improved dispersants of this invention are the Mannich base aminophenol-type condensation products as they are known in the art. Such Mannich condensation products generally are prepared by reacting about 1 mole of long chain hydrocarbon substituted mono and dicarboxylic acids or their anhydrides (e.g., polyisobutylene-substituted succinic anhydride) with an about 1 mole of amine-substituted hydroxy aromatic compound (e.g., aminophenol), which aromatic compound can also be halogen- or hydrocarbyl-substituted, to form a long chain hydrocarbon substituted amide or imide-containing phenol intermediate adduct (generally having a number average molecular weight of 700 or greater), and condensing about a molar proportion of the long chain hydrocarbon substituted amide- or imide-containing phenol intermediate adduct with about 1 to 2.5 moles of formaldehyde and about 0.5 to 2 moles of the second adduct of this invention.

The preparation and use of the hydroxy aromatic compounds and amino-substituted hydroxy aromatic compounds, and methods useful for reaction thereof with an aldehyde and the selected amine or alcohol are as described in U.S. Pat. Nos. 4,820,432 and 4,828,742.

The selected reactive amine compound (e.g., an alkylene polyamine) is readily reacted with the selected polymer substituted with mono- or dicarboxylic acid, anhydride (e.g., alkenyl succinic anhydride), ester, or thiol ester by heating an oil solution containing 5 to 95 wt. % of the polymer substituted dicarboxylic acid material to about 100° to 250° C., preferably 125° to 175° C., generally for 1 to 10, e.g., 2 to 6 hours until the desired amount of water is removed. The heating is preferably carried out to favor formation of imides and/or amides, rather than salts. Generally from 1 to 5, preferably from about 1.5 to 3 moles of mono- or dicarboxylic acid moiety content (e.g., grafted maleic anhydride or grafted acrylic acid content) is used per reactive nitrogen equivalent (preferably per equivalent of primary nitrogen) of the amine compound.

Preferably, the polymer substituted mono- or dicarboxylic acid producing material and amine compound will be contacted for a time and under conditions sufficient to react substantially all of the primary nitrogens in the second adduct reactant. The progress of this reaction can be followed by infra-red analysis.

The dispersant-forming reaction can be conducted in a polar or non-polar solvent (e.g., xylene, toluene, benzene and the like), and is preferably conducted in the presence of a mineral or synthetic lubricating oil.

The ester-containing dispersant additive employed in this invention can be derived by reacting the aforesaid long chain hydrocarbon substituted mono- or dicarboxylic acid material and one or more hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms.

The ester dispersant may also be derived from unsaturated alcohols, ether alcohols, and amino alcohols.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022.

Hydroxyamines can also be reacted with the aforesaid long chain hydrocarbon substituted dicarboxylic acid materials to form dispersants.

Preferred in the present invention are polymer-substituted nitrogen-containing dispersant additives. Most preferred are polyisobutenyl succinimide dispersants.

Boric Acid

Boric acid which is charged to the boration reaction zone in the process of the present invention is preferably substantially anhydrous, and will generally contain less than about 0.2 wt. % of water, preferably from about 0.1 to 0.2 wt. % water. The particles of boric acid can be characterized by a $\phi$ value of not greater than about 450 (e.g., typically from about 200 to 450), and preferably not greater than about 430 (e.g., 300 to 430). Smaller $\phi$ values are preferred.

The $\phi$ value, as used in the present invention, is the ratio of the total spherical volume occupied by boric acid particles in synthetic or petroleum oil, typically a neutral normal point petroleum base stock, to the total spherical area by the boric acid particles wetted by petroleum base stock. This parameter (i.e., $\phi$) is calculated by utilizing raw statistical data provided by the Brinkmann Particle Size Analyzer Model 2010 (manufactured by Galia Instruments of Israel). The description of the method of obtaining data, the particle size analyzer and statistical treatment of the data is presented in the Brinkmann brochure and operating manual referred to above. Such data is provided as probability volume particle population density (percent ranges).

Generally, the Brinkmann particle size analyzer operates as follows. A particle flows through a ring or cylinder of monochromatic light and interrupts the beam. If the particle passes through the beam cleanly, the diameter measurement is accepted. If it passes through the beam partially, it is rejected. Diameter is calculated based on the particle's velocity. Particles are assumed to be spherical, but an aspect ratio, the ratio of the length to the width, can be inputted to correct for non-spherical shapes. A microscopic video camera is built in to verify spherical geometry of the sample. In all cases, the boric acid particles detected closely approximated spheres. Sample concentration is important. Samples with too high a concentration give noisy signals and excessive rejection rate of particles. Samples which are too dilute give excessively long acquisition times and possibly non-representative population sampling. The rate slurry or suspension is pumped through the flow cell and, based upon desired input population size to the machine, the analyzer will continue to count accepted particles until the desired population size is achieved. The machine can also be programmed to take multiple acquisitions to accumulate a more statistically significant population size. The raw number data is accumulated and normalized to give as the output a particle size distribution in terms of the volume, area and/or actual number of particles. The data can be provided in the form of a volume distribution table in which the volume percent of particles is presented for each of a plurality of particle size distribution segments spanning the particle size range.

The preferred instrument (Brinkmann 2010, Particle Size Analyzer) uses a focused scanning-laser spot and a simple time-domain analysis (time of transition) to measure particle diameters precisely, from 0.5 to 1200$\mu$. The range can vary for smaller particles. In accordance with the boric acid of the present invention, the particle size range employed is from 5 to 600 $\mu$. The time-of-transition principle states that when a scanning laser beam moving at a fixed velocity (v) is measured for the time (t) it takes to cross the diameter of any particle, the distance (d) or particle diameter can be calculated.

$$v \times t = d$$

A He—Ne laser beam passes through a spinning 1° wedge prism which rotates the beam at a constant velocity, creating a 600 g diameter scanning circle. The beam passes through a microscope objective, creating a 1.2$\mu$ "spot" focused within the sample cell. The focal plane, the laser spot, and the scanning circle define the measuring zone.

The rotating beam continues through the sample cell and falls on a PIN photodiode that measures the beam's intensity. A particle moving through the measuring zone interrupts the beam, causing an interactive pulse or "shadow" on the photodiode. The duration time (t) of interaction coupled with the rotational speed (v) of the prism (and beam) sets up the equation for the measurement of the distance (d). Each time of transition is directly mapped to its corresponding diameter. The rapid speed of the moving beam renders particles "stationary", eliminating sources of error due to particle movement. Signals from an out-of-focus or off-center interaction can create statistical errors. The time from the beginning of an interaction to the point of darkest occlusion of light (rise time) is measured. The time it takes the beam to cross the chord of the particle (time of transition) is measured.

Out-of-focus or off-center interactions generate rise times that are too long in proportion to the particle diameter. Using an algorithm based on the overall pulse signature with normalized rise-time criteria, each interaction is accepted or rejected. Only data from accepted signals are filed for analysis.

As noted earlier, the particle size data can be presented in terms of the number, area and volume of particles in each of a plurality of particle size distribution segments spanning the particle size range. Preferably, the particle size data is determined as a normalized volume distribution; i.e., the volume percent of the particles in the boric acid sample which fall within each of the particle size distribution segments. The parameter $\phi$ is based upon this normalized volume distribution and is arrived at by:

(1) assigning the average particle diameter in each of the distribution segments reported by the Brinkmann Particle Size Analyzer (for example, 5 microns is the average diameter for the distribution segment covering particle sizes in the range from 4 to 6 microns; 7 microns is the average diameter for the segment covering the range from 6 to 8 microns; and so forth);

(2) calculating a sphere volume and a sphere surface area (hereinafter defined) of each segment of the particle distribution using the assigned average particle diameter and the measured particle volume percent of the segment.

(3) summing the sphere volumes for all the segments to obtain the total spherical volume;

(4) summing the sphere areas for all the segments to obtain the total spherical external surface; and (5) dividing the total spherical volume by the total spherical external surface to obtain the $\phi$ value.

The sphere volume and sphere surface area of a distribution segment are defined by the following equations:

$$\text{Sphere volume} = (4/3)N\pi d^3 \quad (1)$$

$$\text{Sphere surface area} = N\pi d^2 \quad (2)$$

wherein d is the average particle diameter of the segment and N is the measured particle volume percent of the segment.

The distribution segments employed for calculating $\phi$ cover particles ranging in size from 5 to 600 microns. The distribution segments are 4–6, 6–8, 814 10, 10–14 14, 14–20, 20–30, 30–40, 40–50, 50–60, 60–70, 70–80, 80–90, 90–100, 100–150, 150–200, 200–300, 300–400, 400–500, and 500–600 microns.

Accordingly, the parameter $\phi$ can be defined in terms of equation (3) following:

$$\phi = \frac{\text{total spherical volume}}{\text{total spherical surface area}} = \frac{\Sigma_i (4/3) N_i \pi d_i^3}{\Sigma_i N_i \pi d_i^2}$$

wherein, for each of a plurality of distribution segments defining a particle size range, $d_i$ is the average particle diameter for the ith distribution segment; $N_i$ is the particle volume percent of the ith distribution segment; and the sum is taken over all the segments. The distribution segments i are the segments defined in the preceding paragraph.

As should be clear from equation (3), the $\phi$ parameter has the dimensions of length (i.e., microns) and is a type of volume-weighted particle diameter. Consequently, the $\phi$ value is sensitive to, and therefore reflects, the presence of relatively large-sized particles in a boric acid sample. Because the formation of sediment byproduct in the boration of lubricating oil additives can be affected by the presence of large particles (e.g., 500 to 600 microns) in the boric acid employed, the $\phi$ parameter is a useful means for screening and/or identifying boric acid materials which can minimize sediment formation. Accordingly, the improved low sediment process of the invention employs boric acid having a $\phi$ value of not greater than about 450.

Boric acid samples can of course contain particles having diameters less than 5 microns and/or greater than 600 microns. For the purpose of calculating $\phi$, bode acid particles less than 5 microns in diameter are ignored because of their relatively insignificant impact on per cent volume measurements. Thus, the Brinkmann Particle Size Analyzer is programmed not to measure their diameters and the particles are not included in the particle size distribution. On the other hand, boric acid particles having diameters greater than 600 microns can be included in the determination of $\phi$. If the sample contains particle sizes greater than 600 microns, the sample is processed to separate the large-sized particles prior to the size analysis. The size analysis is then conducted using the Brinkmann analyzer, or other instrument or technique providing an equivalent analysis, only on the portion of the sample containing particle sizes less than 600 microns. The resulting particle distribution is then adjusted to account for the particles greater than 600 microns before calculating the $\phi$ value.

A preferred method for calculating the $\phi$ value of boric acid samples containing particle sizes greater than 600 microns is the following: The dry boric acid (i.e., no more than about 0.2 wt. % water) is passed through a 40 mesh sieve to selectively remove particle sizes greater than 600 microns. The particles passing through the sieve are then prepared for analysis (e.g., slurried in oil). The wt. % of particles retained by the sieve is determined. It is then assumed that all of the retained particles have a particle size of 600 microns, and the distribution obtained by the analysis is mathematically adjusted to take the sieve-retained particles into account.

Particulate boric acids employed in the process of the invention typically do not contain particle sizes above 600 microns, since they would generally have $\phi$ values above 450.

The sample of boric acid to be used in the Brinkmann particle size analyzer should be a slurry in oil. The concentration should be sufficient in order to operate the instrument. Sample preparation is reviewed in the Brinkmann Operation Manual at Section 4. Dilute samples of boric acid in neutral mineral oil are preferred. The type of oil is not critical and can be petroleum base stock or synthetic oil.

It is preferred to analyze boric acid particle size in the presence of a lubricating oil basestock. It has been found there is good visual evidence for the phenomenon of particle agglomeration: that is, smaller particles have an affinity for larger particles because of the interparticle hydrogen bonding enhanced by the surrounding nonpolar solution which repels the boric acid. Therefore, methods of analysis that rely on dry boric acid (for example, methods which rely on particle size distributions by fluidizing the boric acid in gas streams and passing it through a particle detection system) do not correlate well with such oil-slurry methods of analysis. Slurrying the boric acid in oil gives a more accurate characterization of the particle distribution, where, as here, the oil can be the actual reaction solvent. Particle agglomeration can occur at different distributions particularly those having mixtures of fine and large particles.

Boration Reaction

The selected nitrogen- or ester-containing or metal salt or complex containing dispersant additive and particulate boric acid can be charged separately or in combination to a reaction zone, and the process of the present invention can be carded out in a continuous, semi-continuous or batchwise process. Any conventional apparatus may be employed, and stirred tank reactors and tubular reactors are preferred.

The boration reaction can be carried out in the presence of a solvent or inert diluent for the nitrogen- or ester-containing dispersant. Suitable solvents and inert diluents include mineral lubricating oils, hydrocarbon solvents (e.g., zylene, toluene, benzene, ethylbenzene, and the like), and synthetic oils. Mineral lubricating oils are preferred. Excess liquid polymer can be a co-solvent. Useful oils are described in U.S. Ser. No. 992,871, filed Dec. 17, 1992, (PT-915) referred to above.

The amount of the particulate boric acid charged to the reaction zone can vary widely. Generally, the particulate boric acid will be charged to the boration reaction zone in an amount of from about 0.35 to 5 parts by weight, preferably from about 0.35 to 2.8 parts by weight, and most preferably from about 0.7 to 1.0 parts by weight of the particulate boric acid, per part by weight of the nitrogen-containing or ester-containing polymer additive charged to the boration reaction zone. Based on atomic boron content, there is 2, preferably 0.05 to 1.0 and more preferably 0.1 to 0.5 parts of boron per part of polymer additive. The range of boric acid contemplates one mole of boric acid per mole of functional group of the polymer additive. For nitrogen-containing polymer additives the amount of boric acid is based on the secondary nitrogen content. The above range contemplates two secondary nitrogens per molecule (polyamine).

The addition of boric acid above stoichiometric ratio is considered to be overboration. This process is particularly adaptable to accomplishing "high boron" or "overboration".

A wide variety of temperature and other reaction conditions can be employed in the boration reaction zone. Generally, a temperature of from about 100° to 170° C., preferably from about 110° to 150° C., and more preferably from about 125° to 135° C., will be employed. The pressure in the boration reaction zone can be atmospheric, sub-atmospheric or super-atmospheric. Atmospheric pressures are preferred. A useful pressure range is from 0 to 7000 kPa.

In order to avoid undesired side reactions, the boration reaction zone is preferably purged with nitrogen or other inert gas to exclude air and oxygen gas from above the surface of the liquid reaction medium. However, this is not essential, and good results can be obtained in the presence of air. While the boration reaction can be conducted in air, it is preferred to use an inert atmosphere to prevent oxidation of the basestock.

Experimental results indicate that it is preferred not to strip water off before the reaction. Removal of too much water can lead to boric acid dehydration. Generally, it is preferred not to strip out water before or after reaction.

The selected nitrogen-containing or ester-containing dispersant and particulate boric acid can be charged to the boration reaction zone in any order. Generally, for ease of handling of the reactants, it is preferred that the nitrogen-containing or ester-containing dispersant, and any solvent or inert diluent, be first charged to the boration reaction vessel (for example, a stirred tank vessel), followed by addition of the particulate boric acid to the liquid reaction medium with stirring.

Stirring of a stirred tank vessel can be accomplished by any conventional means, and the degree of mixing will depend upon the density and viscosity of the liquid reaction medium, the size of the liquid reaction medium, and the stirred tank, the degree of baffling within the stirred tank vessel, the rate of addition (and the amount of) the particulate boric acid charged, the precise temperature and the desired reaction time, and other factors. Generally, however, any of the conventional stirred tank vessel stirring devices can be employed, such as retreat blade stirrers, impellets, high shear mixer/dispenser, a swirl box, static mixers, and the like.

The reactants can be charged to the boration reaction zone intermittently, continuously or in a batchwise manner. The reaction zone itself can comprise one reaction vessel or a series of reaction vessels. The reaction vessel can itself be provided with conventional temperature control means. For example, the reaction vessel can be provided with internal heating or cooling coils, with liquid pump-around loops, wherein a portion of the liquid reaction medium is withdrawn, passed to an external heat exchanger and then returned to the reaction liquid for temperature control, and other conventional means.

In the preferred embodiment, commercial granular boric acid particles, typically having average particle size greater than 1200g ($\phi > 1200$), are mechanically reduced by either a wet milling or dry milling technique. Dry milling is preferred. The preferred dry milling is fluidized jet milling. The jet mill fluidized particle bed causes the interaction of the fluidized particles. The particle size is thereby reduced to the ranges useful in the present invention. The milled particles are mixed with from 50 to 80% by weight of oil to form a slurry. The slurry can be reacted as recited above.

Following the completion of the desired reaction time, the low sediment borated dispersant product can be withdrawn from the boration reaction zone and employed directly in the formulation of lubricating oil concentrates and/or fully formulated lubricating oils. The borated dispersants of the present invention are characterized and provide low sediment level. Generally, the borated products of the present invention will contain sediment in an amount less than 0.03 vol. %, preferably less than 0.025 (e.g., from about trace to 0.03 vol. %), more preferably less than about 0.02 vol.% (e.g., from about trace to 0.02 vol. %). A modified ASTM (77–073) test, using heptane solvent) also referred to as a BS&W (Boron Sediment and Water) centrifuge procedure can be used to measure the amount of sediment.

The borated additives produced by the process of the invention contain boron in an amount effective for their normal function. Typically the additives contain up to about 5 wt. % boron, preferably 0.05 to 2.0 wt. % boron (e.g., 0.05 to 0.7 wt. %), based on the total weight of the borated additive.

The borated dispersant or multi functional viscosity index improver can be used in a wide variety of lubricating oils.

Lubricating Compositions

The primary utility for all the above-described post-treated functionalized and/or derivatized polymer, is as an additive for oleaginous compositions. For ease of discussion the above-mentioned material is referred to herein as additive(s) when used in the context of an oleaginous composition containing such "additive(s)".

The additives of the present invention may be used by incorporation and dissolution into an oleaginous material such as fuels and lubricating oils. When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 wt. %, based on the total weight of the composition, will usually be employed.

The additives of the present invention find their primary utility in lubricating oil compositions which employ a base oil in which the additives are dissolved or dispersed therein. The base oils are oils of lubricating viscosity and may be natural oils (e.g., liquid petroleum oils) or synthetic oils (e.g., hydrocarbon oils such as polybutylenes, end-group modified alkylene oxide polymers and copolymers such as diethyl ether of polypropylene glycol, polyol esters, and the like) or mixtures thereof.

The additives of the present invention, particularly those adapted for use as dispersants or viscosity modifiers, can be incorporated into a lubricating oil in any convenient way. Thus, they can be added directly to the oil by dispersing or dissolving the same in the oil at the desired level of concentrations of the additive. Alternatively, the additives can be blended with a suitable oil-soluble solvent and base oil to form a concentrate, and the concentrate can then be blended with a lubricating oil basestock to obtain the final formulation. Such dispersant concentrates will contain, on an active ingredient (AI) basis, from about 10 to about 80 wt. %, typically about 20 to about 60 wt. %, and preferably from about 40 to about 50 wt. %, additive, and typically from about 40 to 80 wt. %, preferably from about 40 to 60 wt. base oil, i.e., hydrocarbon oil based on the concentrate weight.

The additives of the present invention may be mixed with other types of conventional additives, each selected to perform at least one desired function. Among the other additives which may be in the lubricating oil formulation are metal containing detergent/inhibitors, viscosity index improvers and anti-wear agents. The metal detergent/inhibitors are generally basic or overbased alkali or alkaline earth metal salts or mixtures thereof, (e.g., mixtures of Ca and Mg salts) of one or more organic acids (e.g., sulfonates, naphthenates, phenates and the like). Viscosity index improvers (i.e., viscosity modifiers) are generally hydrocarbon polymers or polyesters, optionally derivatized to impart dispersancy or some other property, having number average molecular weights of from $10^3$ to $10^6$. The antiwear agents are typically oilsoluble zinc dihydrocarbyl dithiophosphates.

Still other conventional additives that may be used in the formulations are antioxidants, corrosion inhibitors, friction modifiers, foam inhibitors, rust inhibitors, lube oil flow improvers, seal swell control agents, and the like.

Compositions, when containing one or more of these additives, typically are blended into the base oil in amounts which are effective to provide their normal attendant function. In such compositions, the additives of the present invention are generally employed (e.g., as a dispersant additive) in an amount of 0.1 to 20 wt. %, preferably 0.1 to 6 wt. %, based upon the total weight of the composition.

The improved process of this invention can be further illustrated by reference to the following examples, wherein pans are by weight unless otherwise indicated.

EXAMPLES

PIBSA-PAM

Unless otherwise indicated, Examples and Comparative Examples used the following general procedure to make polyisobutylene succinimide (PIBSA-PAM).

A polyisobutylene succinic anhydride (PIBSA) of known composition, SAP number=37, BS&W sediment=0.004 volume %, 625 grams of PIBSA was charged to a round bottom reaction flask. To that PIBSA, 95.9 parts of a neutral 150 weight petroleum basestock was added. The reactor had a "half moon" or crescent shaped agitator blade coupled with an electric drive variable speed motor with a digital readout in revolutions per minute. The desired speed was programmed into the drive unit and the motor maintained this RPM during the reaction. This was 150 RPM unless otherwise indicated. An electric heating mantle was attached to the bottom of the reactor and via either a thermocouple or mercury thermometer/optical switch arrangement, a signal was sent to a temperature controller which in turn varied the voltage to the heating mantle. A desired setpoint was entered or set on the control mechanism. The reaction mixture was maintained at all times under a nitrogen blanket to prevent oxidation of the neutral basestock oil diluent at high temperatures. The temperature controller was set at 128° C. and when the reaction mass was at about 40° C., the agitator drive was set to the specified RPM which was varied for individual experiments. Once the reaction mass had reached 128° C., the polyamine (PAM) addition began. Using a graduated dropping funnel with a sidearm, 21.6 grams of PAM was charged to the funnel. PAM was charged to the reaction mass in quarter volume charges using the graduated markings on the funnel as a guide. At time equal to zero, 25% of the PAM required was added by volume into the reactor. The reactor soaked for 15 min. at this temperature under agitation and then the 25% volume addition sequence and time was repeated until all the PAM was consumed. The reactor soaked for an additional 30 min. under a nitrogen sweep or blanket condition.

Boration of PIBSA-PAM

Unless otherwise indicated, the following procedure was used to borate the PIBSA-PAM.

The reaction then entered the boration phase. A boric acid slurry was prepared by either using a commercially available boric acid or subjecting an available boric acid to a wet or dry milling technique to reduce the particle size. Then a neutral basestock was added either to the resulting dry milled powder, the commercially available dry boric acid, or milled boric acid paste to form a desired weight percent of boric acid slurry in oil. This slurry was charged into four small addition beakers which were each contained to 25% by weight of the total desired mass. At the conclusion of a 30 min. soak period the reactor was maintained at 128° C. and the first addition of bode acid was added to the mixture. One half hour later, the second addition was added and the reactor then allowed to soak an additional 30 min. This procedure was repeated until all of the boric acid was consumed. The reactor was allowed to soak an additional hour after the last addition of boric acid under a nitrogen blanket or seep. The product was then ready for use.

Example 1

The above described PIBSA-PAM was borated using the low temperature amination boration process described in detail. A dry milled boric acid was provided by a manufacturer using their own internal proprietary methods. This milled boric acid was then slurried in a petroleum basestock and used to borate the PIBSA-PAM in the manner described above. 11.6 grams of boric acid slurry was added to the 66.0 gram feedstock to form a 15 wt. % boric acid in oil compound. A particle size measurement was taken of the slurry as well. As shown in Table I, this resulted in a measured $\phi$ of 327 for the starting boric acid. The BS&W sediment level of the resulting product was 0.016 volume %. The reaction temperatures and the results are also reported in Table II.

Examples 2–4

Additional samples of the above described PIBSA-PAM were borated using the procedure of Example 1 employing the particulate boric acids described in Table II. Table II reports the reaction temperatures, the $\phi$ values of the boric acids and the sediment levels of the resulting products.

Comparative Example 5

The standard low temperature amination boration process described above (except a resin kettle or U-shaped reactor was used instead of a round bottom reaction flask) was conducted using the particulate boric acid described in Table II. The reactor agitators in both the amination reactor and boration reactor were operated at 800 rpm. The results are presented in Table II.

Comparative Example 6

The standard low temperature amination boration process described in detail above was conducted using the particulate boric acid described in Table II, which also present the results.

Example

A spherical vessel is charged with 863.1 grams of 2200 MW-based PIBSA and S150N base oil and heated to 115° C. To that mass, 23.7 grams of polyamine is added over a one hour time period. The material is stripped with nitrogen for one half hour and the mass is then heated to a temperature of 149° C. To this reaction mass is added a milled suspension of boric acid. The milling was accomplished in a separate vessel by adding solid boric acid to oil and maintaining it at 100° C. under high shear conditions for over an hour. The milled boric acid had a $\phi$ of 415. 78.3 grams of this slurry at 15% solids was added over a one hour period and the resulting product stripped with nitrogen at reaction temperature for one hour. The reactor was sampled and some of the raw product was added to 50 ml of heptane in a BS&W tube. The tube was spun at 1800 rpm in a centrifuge for a period of one hour. The resulting sediment product on the bottom was measured as volume percent of the total tube volume and doubled to correct for the solvent dilution effect. A sediment level of 0.016 vol. % resulted with a filtered boron content of 0.25% and an ASTM D-1500 color of 2.0 at a 15% weight dilution in white oil. Comparative Example 8

The process as described in Example 7 was conducted using a conventional granular solid form of boric acid, except that the reaction mass was heated to 163° C. before the boric acid was added. Table II presents the results.

Comparative Example 9

The process as described in Comparative Example 8 was repeated, except that the reaction mass was maintained at 149° C. before the boric acid was added. Table II presents the results.

Comparative Example 10

The process as described in Example 7 was conducted using a granular boric acid slurry in petroleum basestock, except that the amination temperature was 135° C. and the reaction mass was maintained at 135° before the boric acid was added. Table II presents the results.

Example 11

The process as described in Example 7 was conducted using a milled boric acid suspension, except the amination was conducted at 115° C. and the reaction mass was heated to 135° before addition of the boric acid. Table II presents the results.

As can be concluded from the above experiments, the amination temperature, boration temperature and the use of a milled suspension of boric acid are variables in producing a low sediment product. It can also be observed that the process borates the molecule more efficiently and to a higher level than can be accomplished by conventional techniques. The more efficient boration technique also neutralizes the basicity of the dispersant molecule to a higher degree as evident by the higher boron content. It is theorized that this suppresses the interaction between the dispersant and the unsaturation in the base oil leading to a lower color dispersant.

TABLE I

| Determination of $\phi$ Value for Example 1 | | | | |
|---|---|---|---|---|
| Distribution Segment (microns) | d | N | Sphere Volume (4/3 N$\pi$d$^3$) | Sphere Surface Area (N$\pi$d$^2$) |
| 4–6 | 5 | 0.07 | 3.67 * 10$^1$ | 5.5 |
| 6–8 | 7 | 0.31 | 4.45 * 10$^2$ | 4.77 * 10$^1$ |
| 8–10 | 9 | 0.55 | 1.68 * 10$^3$ | 1.40 * 10$^2$ |
| 10–14 | 12 | 0.93 | 6.73 * 10$^3$ | 4.21 * 10$^2$ |
| 14–20 | 17 | 0.61 | 1.25 * 10$^4$ | 5.54 * 10$^2$ |
| 20–30 | 25 | 1.03 | 6.74 * 10$^4$ | 2.02 * 10$^3$ |
| 30–40 | 35 | 1.68 | 3.02 * 10$^5$ | 6.47 * 10$^3$ |
| 40–50 | 45 | 2.02 | 7.71 * 10$^5$ | 1.29 * 10$^4$ |
| 50–60 | 55 | 1.54 | 1.07 * 10$^6$ | 1.46 * 10$^4$ |
| 60–70 | 65 | 1.21 | 1.39 * 10$^6$ | 1.61 * 10$^4$ |
| 70–80 | 75 | 1.62 | 2.86 * 10$^6$ | 2.98 * 10$^4$ |
| 80–90 | 85 | 2.06 | 5.30 * 10$^6$ | 4.68 * 10$^4$ |
| 90–100 | 95 | 2.79 | 1.00 * 10$^7$ | 7.91 * 10$^4$ |
| 100–150 | 125 | 22.36 | 1.83 * 10$^8$ | 1.10 * 10$^6$ |
| 150–200 | 175 | 28.6 | 6.42 * 10$^8$ | 2.75 * 10$^6$ |

TABLE I-continued

Determination of $\phi$ Value for Example 1

| Distribution Segment (microns) | d | N | Sphere Volume (4/3 N$\pi$d$^3$) | Sphere Surface Area (N$\pi$d$^2$) |
|---|---|---|---|---|
| 200–300 | 250 | 27.08 | 1.77 * 10$^9$ | 5.32 * 10$^6$ |
| 300–400 | 350 | 4.53 | 8.14 * 10$^8$ | 1.74 * 10$^6$ |
| 400–500 | 450 | 0.89 | 3.40 * 10$^8$ | 5.66 * 10$^5$ |
| 500–600 | 550 | 0.12 | 8.36 * 10$^7$ | 1.14 * 10$^5$ |
| Total | | 100 | 3.86 * 10$^9$ | 1.18 * 10$^7$ |
| | | $\phi$ value = 327 | | | d = average particle diameter of the distribution segment.
N = the particle volume percent of the distribution segment.

TABLE II

| Example Number | Boric Acid Employed | $T_A$ (°C.) | $T_B$ (°C.) | $\phi$ Value | BS&W Sediment (volume %) | Boron Content (wt. %) | ASTM D-1500 Color |
|---|---|---|---|---|---|---|---|
| 1 | dry milled, oil slurried | 128 | 128 | 327 | 0.016 | — | — |
| 2 | lab milled, oil slurried | 128 | 128 | 415 | 0.016 | — | — |
| 3 | commercial pharmaceutical grade, oil slurried | 128 | 128 | 423 | 0.02 | — | — |
| 4 | pilot plant milled, oil slurried | 128 | 128 | 440 | 0.03 | — | — |
| Comparative 5 | pilot plant milled, oil slurried | 128 | 128 | 500 | 0.04 | — | — |
| Comparative 6 | commercial powdered grade, oil slurried | 128 | 128 | 625 | 0.08 | — | — |
| 7 | high shear milled, oil slurried | 115 | 149 | 415 | 0.016 | 0.25 | 2.0 |
| Comparative 8 | granular | 115 | 163 | >1200 | 0.3 | 0.19 | 2.5 |
| Comparative 9 | granular | 115 | 149 | >1200 | 0.6 | 0.19 | 3.0 |
| Comparative 10 | granular, oil slurried | 135 | 135 | >1200 | 0.038 | 0.22 | — |
| 11 | milled, oil slurried | 115 | 135 | 415 | 0.01 | 0.22 | — |

The following are details supplementing the description in the text:

Example 2 - The boric acid was provided using a one horsepower high shear disperser manufactured by Ross Co. by making a slurry of granular boric acid in petroleum oil and mixing it in the apparatus.

Example 3 - A commercially available pharmaceutical grade of very fine boric acid was obtained from a supplier and intimately mixed in a high speed industrial blender for 5 minutes in the presence of a petroleum basestock.

Example 4 - The boric acid was provided using a twenty give horsepower high shear disperser manufactured by Goodway Co. which was fed continuously with a feed of slurried boric acid in oil.

Comparative Example 5 - The boric acid was provided using a ten horsepower high shear disperser manufactured by the Silverson Co. which was fed continuously with a feed of slurried boric acid in oil. Because the acid slurry had a high contamination of granular boric acid, it was difficult to make an accurate acquisition of the particle size distribution due to flow cell plugging.

Comparative Example 6 - The commercially available powdered grade was obtained from a supplier and intimately mixed in a high speed industrial blender for 5 minutes in the presence of a petroleum basestock. To determine the $\phi$ value, the powdered material was first passed through a 40 mesh sieve screen and found to have about 10 wt. % of the mass retained on the screen. The particle size analysis was conducted on the solid (after slurrying in oil) which passed through the screen. The resulting distribution was adjusted to account for the missing mass under the assumption that it consisted of 600 micron particles.

$T_A$ = amination temperature
$T_B$ = boration temperature

We claim:

1. An improved low sediment process for forming a borated, oil soluble, polymersubstituted, nitrogen- or ester-containing lubricating oil additive which comprises:

(a) contacting a polymer-substituted, nitrogen- or ester-containing additive in the presence of a solvent therefor, under boronating reaction conditions in a reaction zone with particulate boric acid having a particle size distribution in lubricating oil characterized by a $\phi$ value of not greater than about 450, wherein said $\phi$ value is the ratio of said particles' total spherical volume divided by said particles' total spherical external surface area; wherein the total spherical volume is the sum of all sphere volumes of formula (4/3)N$\pi$d$^3$ of each of a plurality of distribution segments and the total spherical external surface is the sum of all sphere surface areas of formula N$\pi$d$^2$ of each said distribution segment; wherein for each said segment, N is the particle volume percent of the segment and d is the average particle diameter; and (b) recovering said borated additive.

2. The process according to claim 1 wherein the polymer-substituted additive comprises a polyalkenyl-substituted succinimide.

3. The process according to claim 2 wherein the polyalkenyl-substituted succinimide is polyisobutenyl-substituted succinimide.

4. The process according to claim 1 wherein the $\phi$ value is from about 200 to 450.

5. The process according to claim 1 wherein said $\phi$ value is from about 300 to 400.

6. The process according to claim 1 wherein the boric acid particles are charged to the reaction zone as a lubricating oil slurry or suspension.

7. The process according to claim 1 wherein the contacting is effected at a temperature of from about 100° to 170° C.

8. The process according to claim 1 wherein the contacting is effected at a temperature of from about 110° to 150° C.

9. The process according to claim 1 wherein from about 0.35 to 5 parts by weight of the boric acid are charged to the reaction zone per part by weight of the non-borated, polymer-substituted additive.

10. The process according to claim 1 wherein the recovered borated additive contains less than about 0.03 vol. % sediment.

* * * * *